(12) United States Patent
Gruninger et al.

(10) Patent No.: US 9,748,979 B2
(45) Date of Patent: Aug. 29, 2017

(54) SYSTEM FOR PROVIDING SOFTWARE DEFINED RADIO ON A DEVICE

(71) Applicant: TapHere! Technology, Manassas, VA (US)

(72) Inventors: John Gruninger, Gainesville, VA (US); Christopher Todd, Ashburn, VA (US); Matthew Todd, Evergreen, CO (US)

(73) Assignee: TAPHERE! TECHNOLOGY, LLC, Manassas, VA (US)

( * ) Notice: Subject to any disclaimer, the term of this patent is extended or adjusted under 35 U.S.C. 154(b) by 144 days.

(21) Appl. No.: 14/795,124

(22) Filed: Jul. 9, 2015

(65) Prior Publication Data

US 2016/0099728 A1    Apr. 7, 2016

Related U.S. Application Data

(60) Provisional application No. 62/059,890, filed on Oct. 4, 2014.

(51) Int. Cl.
*H04B 7/00* (2006.01)
*H04B 1/00* (2006.01)
*H04W 88/02* (2009.01)

(52) U.S. Cl.
CPC ........... *H04B 1/0003* (2013.01); *H04W 88/02* (2013.01)

(58) Field of Classification Search
CPC .................................................... H04W 88/02
See application file for complete search history.

(56) References Cited

U.S. PATENT DOCUMENTS

| | | | |
|---|---|---|---|
| 6,526,110 B1 | 2/2003 | Bao et al. | |
| 6,658,267 B1 | 12/2003 | Baranowski | |
| 7,193,435 B2 | 3/2007 | Grabill | |
| 7,404,074 B2 | 7/2008 | Murotake | |
| 7,539,175 B2 | 5/2009 | White et al. | |
| 7,681,239 B2 | 3/2010 | Hassan et al. | |
| 7,995,998 B2 | 8/2011 | Wright et al. | |
| 8,155,642 B2 | 4/2012 | Russell | |
| 8,275,323 B1 * | 9/2012 | Shirali | H04W 72/04 370/229 |
| 8,400,974 B2 | 3/2013 | Mueck et al. | |
| 8,886,253 B2 | 11/2014 | Pärssinen et al. | |
| 2004/0063425 A1 | 4/2004 | Wakutsu | |
| 2006/0015579 A1 | 1/2006 | Sastri | |
| 2006/0264171 A1 | 11/2006 | Kwon et al. | |
| 2008/0159207 A1 * | 7/2008 | Levine | H04W 16/14 370/329 |

(Continued)

FOREIGN PATENT DOCUMENTS

| | | |
|---|---|---|
| CA | 2544024 A1 | 5/2005 |
| EP | 2255444 A1 | 12/2010 |

(Continued)

OTHER PUBLICATIONS

Kees et al( Vector processing as an Enabler for Software-Defined Radio in Handheld device, Feb. 15, 2004, revised Feb. 23, 2005, EURASIP Journal on Applied Signal Processing).*

(Continued)

*Primary Examiner* — Maharishi Khirodhar
(74) *Attorney, Agent, or Firm* — Cantor Colburn LLP

(57) ABSTRACT

A system for providing software defined radio on a mobile device includes a hardware portion including an antenna and an interface configured to connect to the mobile device; a software portion configured for execution on the mobile device, the software portion configured to receive and process RF signals received at the antenna.

1 Claim, 3 Drawing Sheets

(56) References Cited

U.S. PATENT DOCUMENTS

| | | |
|---|---|---|
| 2011/0113232 A1 | 5/2011 | Westmeijer |
| 2013/0281047 A1 | 10/2013 | Daly |
| 2013/0287070 A1 | 10/2013 | Lee et al. |
| 2014/0056386 A1* | 2/2014 | Jomatsu ............ H04L 27/3863 375/320 |
| 2015/0326702 A1* | 11/2015 | Ames .................... H04M 1/03 455/556.1 |

FOREIGN PATENT DOCUMENTS

| | | |
|---|---|---|
| GB | 2457987 A | 9/2009 |
| JP | 2001189763 A | 7/2001 |
| JP | 2006135707 A | 5/2006 |

OTHER PUBLICATIONS

Cho, Hsin-Hung et al., "Integration of SDR and SDN for 5G", IEEE Access, Special Section on 5G Wireless Technologies: Perspectives of the next generation mobile communications and networking, vol. 2, 2014, pp. 1196-1204.

Haghighat, Afshin, "A Review on Essentials and Technical Challenges of Software Defined Radio", MILCOM 2002 Proceedings vol. 1. IEEE, pp. 377-382.

Mitola III, Joseph et al., "Cognitive Radio: Making Software Radios More Personal", IEEE Personal Communications, Aug. 1999, pp. 13-18.

Mitola III, Joseph, "Cognitive Radio for Flexible Mobile Multimedia Communications", Mobile Networks and Applications 6, 435-441, 2001.

Nakajima, Nobuo et al., "Research and Developments of Software-Defined Radio Technologies in Japan", Topics in Software and DSP in Radio, IEEE Communications Magazine, Aug. 2001, pp. 146-155.

Tolson, Matthew R. et al., "Totally-Ordered, Reliable Multicast over Cognitive Radio Networks", 2014 47th Hawaii International Conference on System Science, pp. 5135-5143.

* cited by examiner

SYSTEM FOR PROVIDING SOFTWARE DEFINED RADIO ON A DEVICE

CROSS-REFERENCE TO RELATED APPLICATIONS

This application claims the benefit of U.S. provisional patent application Ser. No. 62/059,890, filed Oct. 4, 2014, the entire contents of which are incorporated herein by reference.

BACKGROUND

This disclosure relates generally to Software Defined Radio (SDR). SDR technology and applications have grown across a diverse set of communities including university laboratories, open-source software, high-powered installed devices, and military communications. The technology of using software to modulate and demodulate analog Radio Frequency (RF) in the digital domain is proven and well-tested. There is a need, however, for SDR systems that are compatible with commercially available mobile device platforms.

SUMMARY

An exemplary embodiment includes a system for providing software defined radio on a mobile device, the system including a hardware portion including an antenna and an interface configured to connect to the mobile device; and a software portion configured for execution on the mobile device, the software portion configured to receive and process RF signals received at the antenna.

In addition to one or more of the features described above or below, or as an alternative, further embodiments could include wherein the hardware portion includes an analog-to-digital converter to convert RF signals received at the antenna to digital signals to be processed by the software portion.

In addition to one or more of the features described above or below, or as an alternative, further embodiments could include wherein the hardware portion includes an digital-to-analog converter to convert digital signals from the software portion to analog signals for transmission by the antenna.

In addition to one or more of the features described above or below, or as an alternative, further embodiments could include wherein the software portion includes an RF module.

In addition to one or more of the features described above or below, or as an alternative, further embodiments could include wherein the RF module is configured to receive a digitized RF signal from the hardware portion and acquire in-phase and quadrature phase components of the digitized RF signal.

In addition to one or more of the features described above or below, or as an alternative, further embodiments could include wherein the software portion includes a modem module to demodulate a digitized RF signal from the hardware portion.

In addition to one or more of the features described above or below, or as an alternative, further embodiments could include wherein the software portion includes a codec module to decode a digitized RF signal from the hardware portion.

In addition to one or more of the features described above or below, or as an alternative, further embodiments could include wherein the software portion includes a data interpretation module to interpret a digitized RF signal from the hardware portion.

In addition to one or more of the features described above or below, or as an alternative, further embodiments could include wherein the software portion records RF signals received from the hardware portion across a plurality of frequencies.

In addition to one or more of the features described above or below, or as an alternative, further embodiments could include wherein the interface is configured to connect to the mobile device comprises a wired connection.

In addition to one or more of the features described above or below, or as an alternative, further embodiments could include wherein the interface configured to connect to the mobile device comprises a wireless connection.

Another exemplary embodiment includes a computer program product, tangibly embodied on a computer readable medium, for providing software defined radio on a mobile device, the computer program product including instructions that, when executed by a processor, cause the processor to perform operations including providing an RF module configured to receive a digitized RF signal from a hardware portion and acquire in-phase and quadrature phase components of the digitized RF signal; providing a modem module to demodulate an output of the RF module; providing a codec module to decode the output of the RF module; and providing a data interpretation module to interpret the output of the RF module.

DETAILED DESCRIPTION OF EXEMPLARY EMBODIMENTS

Traditional radios are built on proprietary microelectronics and hardware such as Field Programmable Gate Arrays (FPGAs) and custom Application-Specific Integrated Circuits (ASICs). By comparison, embodiments described herein include a modular, SDR platform designed for mobile devices, such as commercial mobile devices (CMDs) including but not limited to smartphones, tablets, watches and small computer platforms. One or more embodiments include a design that enables a flexible and low-cost platform for deploying a Radio Frequency (RF) capabilities across varied environments and systems.

Figure 1:
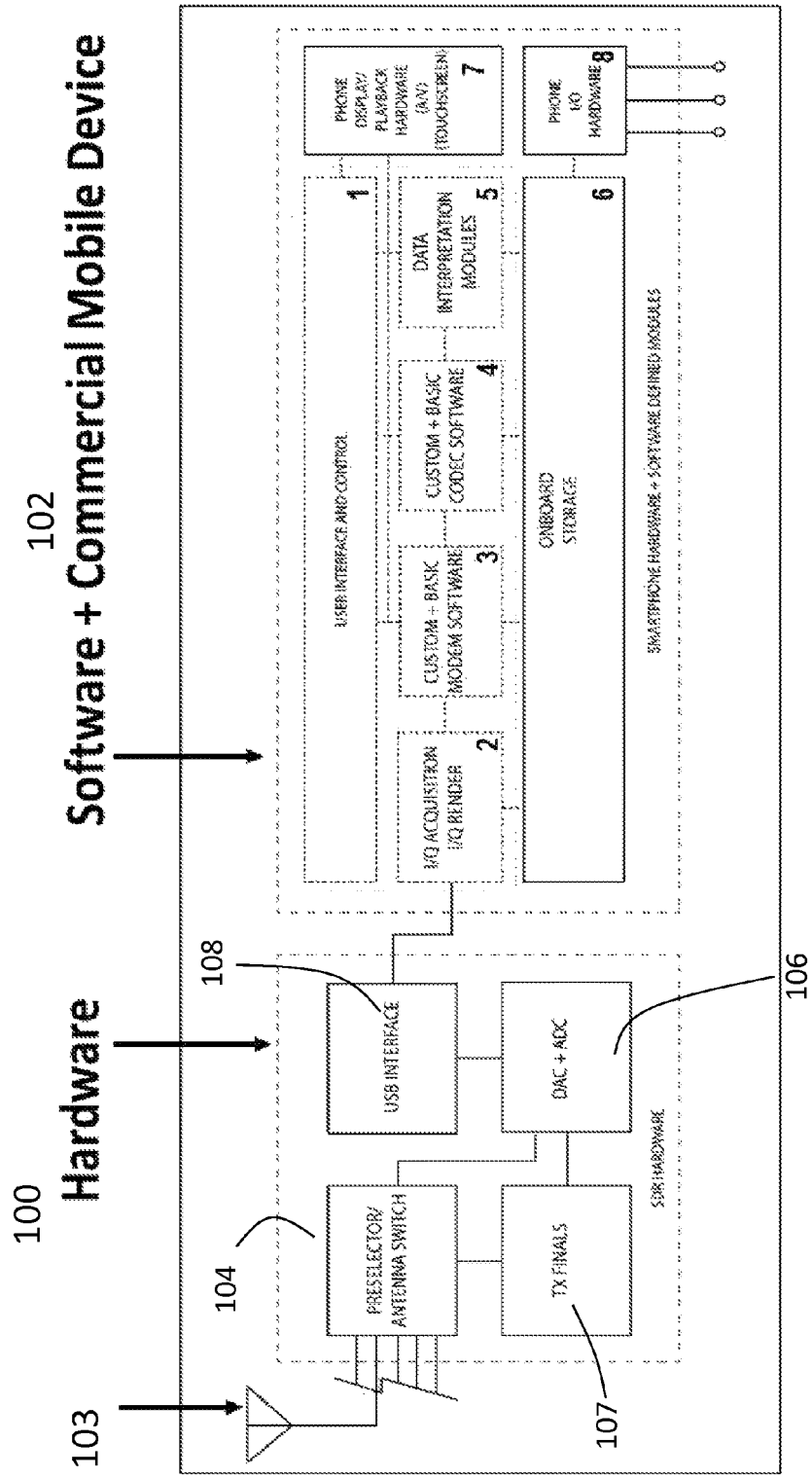
FIG. 1 depicts an SDR in an exemplary embodiment.

FIG. 1 depicts an SDR including a hardware portion 100 and a CMD 102 executing SDR software. The hardware section 100 includes an antenna 103 (e.g., a High Frequency (HF) to Extremely High Frequency (EHF) antenna) for reception and transmission of radio signals. A switch 104 may be used to connected to one of multiple antennas, if the hardware portion 100 is equipped with more than one antenna 103. Hardware portion 100 includes digital-to-analog (DAC) and analog-to-digital (ADC) converter unit 106. Analog signals received on antenna 103 are converted to digital signals prior to transfer to the CMD 102. Conversely, signals from the CMD 102 are converted from digital to analog for transmission over antenna 103. An amplifier 107 is used to amplify signals from the DAC 106 prior to transmission over antenna 103. An interface 108

(e.g., wired interface) connects the hardware portion 100 to the CMD 102. In an exemplary embodiment, the interface is implemented using a USB cable.

Embodiments also include SDR software executing on the CMD 102. The CMD 102 may be an existing, off-the-shelf mobile device including a processor that executes SDR software installed in the CMD 102. As known in the art, the CMD 102 may download and install the SDR software over a network (wired or wireless) from a remote host.

The SDR software enables tuning, playback, and recording of multimedia content from RF transmissions. The received raw, analog RF transmission captured from antenna 103 and digitized by ADC 106 in the hardware portion 100 is processed by the SDR software executing on the CMD 102. Similarly, the SDR software provides the capability to transmit multimedia content via RF over antenna 103. Digitized transmission signals created by the SDR software are emitted via the DAC 106 and the antenna 103.

Figure 2:
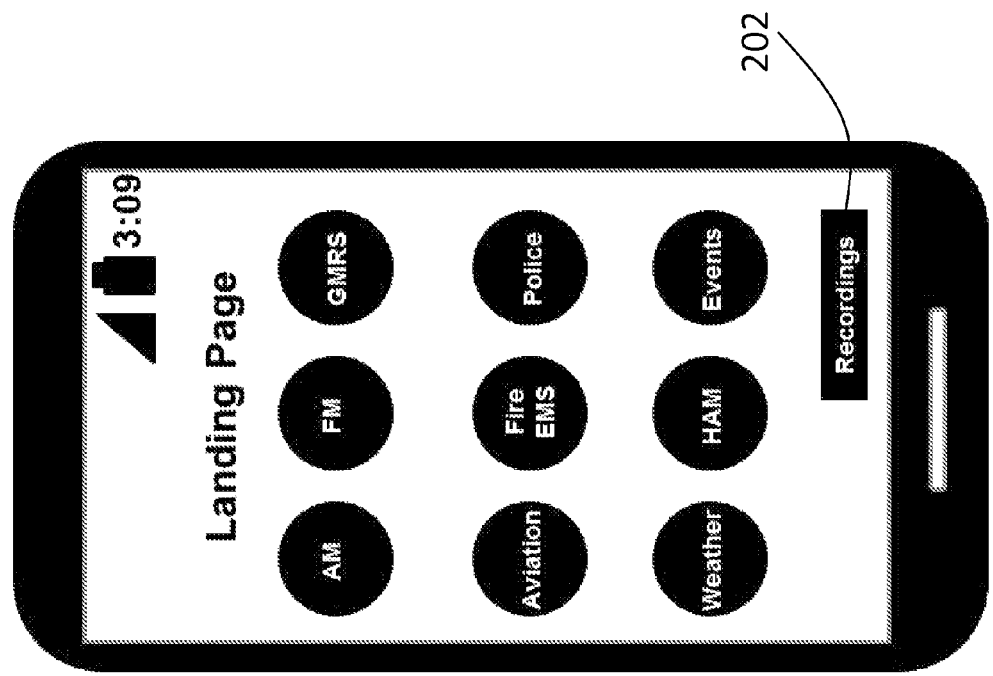
FIG. 2 depicts a landing page user interface in an exemplary embodiment.

The SDR software executing on the CMD 102 allows an off-the-shelf CMD to be programmed for use as an SDR. The SDR software may be made available in the form of an application that a user of the CMD 102 can download and install. The SDR software includes a user interface module 1, that presents a user interface on a display of the CMD 102. The user interface module 1 allows the user to implement a variety of SDR functions. FIG. 2 depicts an exemplary graphical user interface referred to as a landing page. The landing page provides the user with access to common SDR modes and can be configured to include standard and custom modes. The standard modes are packaged with the initial installation of the SDR software on the CMD 102. Custom modes are individually packaged and installed as add-ons. Exemplary standard SDR modes are shown in FIG. 2, but it is understood that embodiments may include other modes.

A recordings icon 202 allows the user to launch a recording page that provides standard smartphone controls to list and select full spectrum recordings available for playback on the CMD 102. The recordings are all of the actual RF signals as captured between the low and high ends of a defined spectrum at the time of recording, regardless of the specific tuned/centered frequency at capture time. The SDR radio of FIG. 1 may continuously record RF signals received at antenna 103, across a plurality of frequencies, and store these recordings in onboard storage 6 (or upload the recordings to remote storage).

Figure 3:
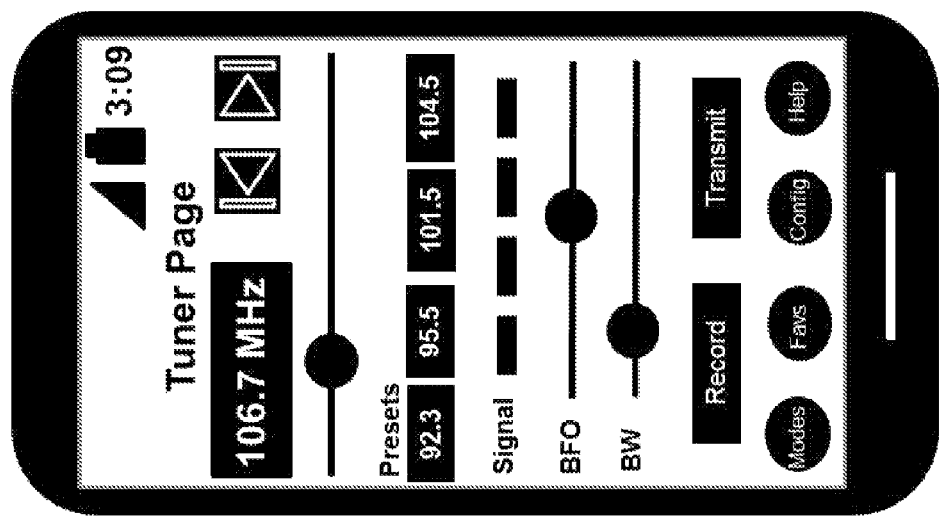
FIG. 3 depicts a tuner page user interface in an exemplary embodiment.

FIG. 3 depicts an exemplary graphical user interface referred to as a tuner page. The tuner page user interface provides standard smartphone controls representing traditional radio controls such as tuning, seeking, signal strength, preset frequencies, bandwidth, Beat Frequency Offset (BFO), and one-touch recording and transmitting of RF signals.

Another exemplary user interface is a settings and preferences interface (not shown) that provides standard smartphone controls for configuration and user experience, including favorite modes, frequency presets, and default geolocation settings that can be automatically configured by the host CMD 102 Global Positioning System (GPS) hardware.

The SDR software includes an RF module 2 that performs acquisition and rendering of RF signals. This RF module 2 acquires and renders raw RF data from/to the ADC/DAC 106 of hardware portion 100. When receiving RF signals, the RF module 2 may acquire the in-phase and quadrature components of the RF signal. When transmitting, the RF module 2 generates an appropriate RF signal for transmission by antenna 103 which is processed by DAC 106 and then transmitted via antenna 103. The ADC 106 may capture the state of a given raw electromagnetic (EM) wave in polar coordinates, where the amplitude is the distance of the sample from origin, the phase is the angle of a line drawn from the origin to the sample from the X-axis, and the frequency is derived from the phase, as the first derivative of phase angle. This sample of amplitude and phase is plotted on an (X,Y) graph and this coordinate system is referred to as in-phase and quadrature-phase (I/Q) data. I and Q can be thought of as RF translations of X and Y and the samples themselves are simply (X,Y) plots on a Cartesian plane. Every (n) time slices, the RF module 2 takes the I/Q sample and records it for further processing. The RF module 2 performs this function as part of the SDR software on the CMD 102 to digitally capture all characteristics of an EM wave at a given frequency.

The I/Q samples from the RF module 2 are provided to a modem module 3, codec module 4 and a data interpretation module 5. These software modules perform algorithms or transforms on the I/Q data as if it were passing through an analog circuit, emulating discrete circuits in SDR software on the CMD 102. To decode AM, for example, the SDR software determines the amplitude (sample distance from the origin on the I/Q plot) of each sample, draws a wave, and converts that to fluctuations in volume on the CMD 102 audio output. With the SDR software, the audio is decoded with better precision and fidelity than any analog circuit.

The modem module 3 and codec module 4 enable decoding and demodulation of other raw signals. The modem module 3 includes a virtual demodulator, which measures the phase angle from sample-to-sample, once again drawing a new waveform from these variations between samples, and feeding it to the CMD 102 audio output. With no hardware changes to the CDM 102, the SDR software can decode FM audio, for example. The same modules enable RF transmission encoding and modulating transmissions from the CMD 102 to hardware portion 100. The transmission (TX) therefore employs the reverse processes as used for receiving transmissions (RX).

The data interpretation module 5 may include one or more modules that are application-level modular (e.g., plug-in) algorithms and utilities which translate raw data into a useable form. For example, a data interpretation module may receive decoded binary numbers that represent a geo-location position, translate those to position, and plot them on a map. Another data interpretation module may take the raw ASCII data from a NOAA Weather alert that represents a "Tornado Warning", cross reference that with the user's current location, and be in charge of sending an alert to the user via an Android notification on the CMD 102. Yet another data interpretation module 5 may scan for patterns in ASCII text decoded by the codec module 4, and send out a local alert over WiFi to the local connected LAN if an EAM (Emergency Action Message) is received.

The signal path from the antenna 103 through the CMD 102 may include ADC 106 changing the analog signals received over the air to digitally coded representations of waves. The modem module 3 then demodulates digital representations of waves into raw data, without doing any decoding or interpretation. The codec module 104 processes raw code from the modem module 3 into correctly formatted data or transforms it into text/digital/speech/images. The data interpretation module 5 may receive data from either the codec module 4 or the modem module 3, depending on the nature of the data. The data interpretation module 5 takes that data (e.g., text, speech, or images), recognizes the data and presents the data to the user in a useable fashion, integrating such things as locations, user preferences, alerts, views, tables, graphs, plots, etc.

The internal storage 6 on the CMD 102 or expansion storage of the CMD 102 (e.g., an SD card) provides the local storage capacity for raw spectrum I/Q, demodulated signals, decoded signals, and interpreted data that can be played back by the SDR software via output hardware 7 of the CMD 102. The SDR software provides wideband capture of a spectrum greater than the initial channel of interest. The output hardware 7 of the CMD 102 may include one or more of a display, a speaker, a touchscreen, etc. to provide user controls for operation, playback, and user feedback. I/O hardware 8 of CMD 102 includes hardware used to drive the display, speaker, touchscreen, etc.

Embodiments adapt SDR to a general-purpose, mass-market, portable CMD 102 with a versatile visual interface and open platform providing flexible, expandable, and scalable RF transceiver capabilities. Embodiments provide the capability of both direct communications and enabled software applications while capturing and recording wide spectrum RF signals that can be played back in original form.

Embodiments virtualize encoding and decoding circuits in the SDR software, which can be swapped in and out, modified, and refined through software modules via the convenience of a CMD 102. Because the modem module 3 is implemented in SDR software, embodiments can be expanded to include RF modulations and signals for any documented modulation schema. A single platform embodiment, therefore, can modulate or demodulate broadcast AM, broadcast FM, weather, GMRS (General Mobile Radio Service), Single Side Band (SSB), digital data Modes, spread-spectrum, and custom waveforms. Any of these modes are sent with no loss or degradation to data codecs which process digital voice, analog voice, images, telemetry, and data.

Embodiments allow a CMD 102 to replace devices that perform unique functions (e.g., emergency radios). While being somewhat larger and heavier than a smartphone itself, in one embodiment, due to the addition of hardware portion 100, the entire SDR system has a target weight of less than 1 pound is far lighter than current handheld radios which range from 1.9 pounds to over 9 pounds.

The SDR software is platform independent and the processing of I/Q signals is not specific to a given ADC or DAC chipset used in the hardware portion 100. Therefore, as higher sample-rate ADC or DAC chipsets are developed or chipsets are discontinued, replacement chipsets can be leveraged without a design change. This will allow all processing, demodulation and intelligence code to remain in place with only minor pin out changes for connectivity to the USB chipset. The processing and demodulating SDR software can be used in other SDR designs on different or proprietary platforms.

The CMD 102 hardware subsystem (e.g. a COTS smartphone) and the remaining ADC and interfaces are derived from common, existing commercial chipsets. The software interfaces meet international standards, including USB 2.0 and 3.0 for the data interface, and I2S for the I/Q signal from the ADC or DAC. The filters and demodulators defined digitally in the SDR software running on the CMD102 is not subject to temperature extremes, and will not drift or vary due to external conditions. Performance is identical in below-zero temperatures as it would be in hot temperatures, given similar ionospheric or troposcatter propagation changes.

The modular SDR software architecture enables the user interface to be tailored to meet different mission requirements via custom graphics and colors. The allows the same software to be ported to support different functional requirements and communities of interest.

As signals technologies, waveforms, CODECs, and RF transmission methods evolve, the SDR software can be updated without requiring new hardware. Software upgrades to the framework are performed over-the-air (OTA), by employing the standard Internet Protocol (IP) interfaces of the CMD 102 such as cellular or WIFI.

The SDR software can record sections of raw radio spectrum for future playback and analysis. The recorded spectrum sample is preserved in its native form and frequency. For example, a video feed can be received and stored, even if the software was not tuned to that specific frequency. In this case, the software can record the entire spectrum segment which includes the video signal, outgoing telemetry controls, operator voice communications, and any streaming data simultaneously. Incoming jamming signals can be recorded as well as any other RF signals existing in range. The spectrum-record feature provides the capability of complete radio-frequency awareness and archiving of any signals in an operator's location, limited only by CMD storage 6 and the antenna 103 and digitization specifications.

Embodiments enable two-way radio communications and advanced Radio Frequency (RF) capabilities directly on CMDs 102, including but not limited to smartphones, tablets, watches, and small computer platforms. The SDR system includes access to a wide range of communications capabilities across the entire Radio Spectrum, including Broadcast FM/AM, Weather, Police scanners, amateur radio communications (i.e., HAM), Fire/Emergency Management frequencies, public safety broadcasts, homeland security notices, and proprietary waveforms and frequencies all from the common and convenient interface of a CMD 102.

Embodiments include SDR software that runs on the CMD 102 for tuning, playback, and recording of multimedia content received from RF transmissions. In addition, this software provides the capability to transmit multimedia content via RF. Embodiments are compatible with a standard set of RF waveforms and CODECs (coder/decoders) with the capability to be expanded to include additional waveforms and CODECs. The modular SDR software architecture enables a framework for expandability. This SDR software may be expanded as additional waveforms, RF spectrum transmission technologies, antenna hardware, and modes are developed. The SDR software may be expanded or updated remotely, similar to how software updates are deployed and installed for other CMD 102 software applications.

As described above, the exemplary embodiments can be in the form of processor-implemented processes and devices for practicing those processes, such as a processor in CMD 102. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer or processor, the computer/processor becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A computer program product, tangibly embodied on a non-transitory computer readable medium, for providing software defined radio on a device, the computer program product including instructions that, when executed by a processor, cause the processor to execute modules comprising:
    an in-phase and quadrature-phase (I/Q) acquisition module configured to receive a digitized radio frequency (RF) signal and acquire in-phase and quadrature-phase components of the digitized RF signal;
    a modem module to demodulate an output of the I/Q acquisition module;
    a codec module to decode the output of the I/Q acquisition module; and
    a data interpretation module to interpret the output of the I/Q acquisition module;
    wherein the I/Q acquisition module, modem module, codec module and data interpretation module comprise independent, modular software modules;
    wherein the I/Q acquisition module captures a state of an electromagnetic (EM) wave in polar coordinates, where an amplitude corresponds to a distance of a sample from an origin, a phase corresponds to an angle of a line from the origin to the sample from an axis, and the frequency is derived as a first derivative of a phase angle;
    wherein the amplitude and the phase represented on an (X,Y) coordinate system provides the in-phase and quadrature-phase components;
    wherein the codec module performs transforms on the in-phase and quadrature-phase components to emulate an analog circuit;
    wherein the codec module determines the amplitude of each sample, creates a waveform, and converts the waveform to provide fluctuations in an output signal;
    wherein the modem module comprises a virtual demodulator to measure a phase angle from sample-to-sample, create a waveform from variations between samples and generate an output signal;
    wherein the data interpretation module comprises a lookup table to translate the output of the I/Q acquisition module into a useable form for other software applications;
    wherein the instructions cause the processor to generate a tuning page, the tuning page providing an interface for one or more of tuning, seeking, signal strength, preset frequencies, bandwidth, Beat Frequency Offset (BFO), one-touch recording of RF signals and transmitting of RF signals;
    wherein the instructions cause the processor to store recordings of RF signals as captured between low and high ends of a defined spectrum at the time of recording, regardless of a specific tuned frequency at capture time.

* * * * *